(12) United States Patent
Zheng et al.

(10) Patent No.: US 8,510,315 B2
(45) Date of Patent: Aug. 13, 2013

(54) PRIORITIZING TRAVEL ITINERARIES

(75) Inventors: Yu Zheng, Beijing (CN); Xing Xie, Beijing (CN)

(73) Assignee: Microsoft Corporation, Redmond, WA (US)

(*) Notice: Subject to any disclaimer, the term of this patent is extended or adjusted under 35 U.S.C. 154(b) by 216 days.

(21) Appl. No.: 12/960,919

(22) Filed: Dec. 6, 2010

(65) Prior Publication Data

US 2012/0143882 A1 Jun. 7, 2012

(51) Int. Cl.
*G06F 17/30* (2006.01)

(52) U.S. Cl.
USPC .............................. 707/751; 707/723; 707/748

(58) Field of Classification Search
None
See application file for complete search history.

(56) References Cited

U.S. PATENT DOCUMENTS

| | | | |
|---|---|---|---|
| 6,584,401 | B2 | 6/2003 | Kirshenbaum et al. |
| 2010/0153292 | A1 | 6/2010 | Zheng et al. |
| 2010/0211308 | A1 | 8/2010 | Zheng et al. |

OTHER PUBLICATIONS

Ardissono; et al., "A Multi-Agent Infrastructure for Developing Personalized Web-Based Systems", ACM Transactions on Internet Technology, vol. 5, No. 1, Feb. 2005, pp. 47-69.

Kim; et al., "TripTip: A trip planning service with tag-based recommendation", Apr. 4-9, 2009, ACM 978-1-60558-247-4/09/04, pp. 3467-3472.

Zheng; et al., "Mining Correlation between Locations Using Human Location History", Published: Nov. 4-6, 2009, pp. 472-475.

Zheng, et al., "GeoLife: A Collaborative Social Networking Service among User, Location and Trajectory", Retrieved at << http://sites.computer.org/debull/A10june/geolife.pdf >>, IEEE Data Engineering Bulletin, vol. 33, No. 2, 2010, pp. 1-8.

Zheng, et al., "Learning Location Correlation from GPS Trajectories", Retrieved at << http://research.microsoft.com/pubs/121308/Learning%20Location%20Correlation%20from%20GPS%20trajectories.pdf >>, Eleventh International Conference on Mobile Data Management, MDM, May 23-26, 2010, Pages 6.

Chen, et al., "Searching Trajectories by Locations—An Efficiency Study", Retrieved at << http://www.itee.uq.edu.au/~zxf/_papers/sigmod299-chen.pdf >>, in proceedings of 29th ACM SIGMOD International Conference on Management of Data (SIGMOD), Jun. 6-11, 2010, Pages 12.

Guc, et al., "Semantic Annotation of GPS Trajectories", Retrieved at << http://plone.itc.nl/agile_old/Conference/2008-Girona/PDF/78_DOC.pdf >>, 11th AGILE International Conference on Geographic Information Science, (AGILE), 2008, pp. 1-9.

Lu, et al., "Photo2Trip: Generating Travel Routes from Geo-Tagged Photos for Trip Planning", Retrieved at << http://jmyanginfo/papers/mm_2010_photo2trip.pdf >>, in Proceedings of the 18th ACM International Conference on Multimedia, Oct. 25-29, 2010, Pages 5.

(Continued)

*Primary Examiner* — Anteneh Girma

(74) *Attorney, Agent, or Firm* — Microsoft Corporation

(57) ABSTRACT

One or more techniques and/or systems are disclosed for prioritizing one or more travel itineraries based on an itinerary query. Respective candidate itineraries from a set of candidate itineraries are ranked based on one or more ranking factors for the candidate itineraries, where the candidate itineraries were identified from a location-interest graph using the query. A desired number of the ranked candidate itineraries are re-ranked based on a one or more historical travel sequences, such that one or more prioritized travel itineraries can be identified in response to the itinerary query.

20 Claims, 8 Drawing Sheets

(56) References Cited

OTHER PUBLICATIONS

Staab, et al., "Intelligent systems for tourism", Retrieved at << http://www.google.com/url?sa=t&source=web&cd=1&ved=0CBIQFjAA&url=http%3A%2F%2Fciteseerxist.psu.edu%2Fviewdoc%2Fdownload%3Fdoi%3D10.1.1.62.1089%26rep%3Drep1%26type%3Dpdf&rct=j&q=Intelligent%20systems%20for%20tourism&ei=HEZ2TNDALZWSjAfCg125Bg&usg=AFQjCNG6FnU3e4Hkci4dmSHaHtZfCEgGhAw&cad=rja >>, IEEE Intelligent Systems, vol. 17, No. 6, 2002, pp. 53-66.

Zheng, et al., "Mining interesting locations and travel sequences from GPS trajectories", Retrieved at << http://research.microsoft.com/pubs/79440/fp120-Mining%20Interesting%20Locations%20and%20Travel%20Sequences%20From%20GPS%20Trajectories.pdf >>, in WWW, Proceedings of the 18th international conference on World wide web, Apr. 20-24, 2009, Pages 10.

Huang, et al., "A Bayesian network and analytic hierarchy process based personalized recommendations for tourist attractions over the Internet", Retrieved at << http://selabjecs.fcu.edu.tw/wiki/images/9/96/2009-12-16_%282009-J%29A_Bayesian_network_and_analytic_hierarchy_process_based_personalized_recommendations_for_tourist_attractions_over_the_Internet.pdf >>, Expert System Application, vol. 36, No. 1, 2009, pp. 933-943.

Kumar, et al., "Advanced traveler information system for Hyderabad city", Retrieved at << http://web.mitedu/~rama/Public/papers/paper8.pdf >>, IEEE Transactions on Intelligent Transportation Systems, vol. 6, No. 1, Mar. 2005, pp. 26-37.

Monreale, et al., "Wherenext: a location predictor on trajectory pattern mining", Retrieved at << http://kissen.cs.uni-dortmund.de:8080/PROCEEDINGS/SIKDD2009/docs/p637.pdf >>, Proceedings of the 15th ACM SIGKDD International Conference on Knowledge Discovery and Data Mining, Jun. 28-Jul. 1, 2009, pp. 637-645.

Cao, et al., "From GPS traces to a routable road map", Retrieved at << http://citeseerx.ist.psu.edu/viewdoc/download?doi=10.1.1.147.7247&rep=rep1&type=pdf >>, 17th ACM SIGSPATIAL International Symposium on Advances in Geographic Information Systems, ACM-GIS, Nov. 4-6, 2009, Pages 10.

Ashbrook, et al., "Using GPS to learn significant locations and predict movement across multiple users", Retrieved at << http://citeseerx.istpsu.edu/viewdoc/download?doi=10.1.1.14.2603&rep=rep1&type=pdf >>, Personal and Ubiquitous Computing, vol. 7, No. 5, Oct. 1, 2003, Pages 15.

Tai, et al., "Recommending personalized scenic itinerary with geotagged photos", Retrieved at << http://ieeexplore.ieee.org/stamp/stamp.jsp?arnumber=04607658 >>, IEEE International Conference on Multimedia and Expo, IEEE ICME, Jun. 2008, pp. 1209-1212.

Li, et al., "Mining user similarity based on location history", Retrieved at << http://research.microsoft.com/pubs/74369/Mining%20user%20similarity%20based%20on%20location%20history.pdf >>, 16th ACM SIGSPATIAL International Symposium on Advances in Geographic Information Systems, ACM-GIS, Nov. 5-7, 2008, Pages 10.

Zheng, et al., "Understanding mobility based on GPS data", Retrieved at << http://research.microsoft.com/pubs/77984/Ubicomp270-yuzheng.pdf >>, UbiComp, 2008, Pages 10.

Zheng, et al., "Understanding transportation modes based on GPS data for web applications", Retrieved at << http://research.microsoft.com/pubs/102101/Understand%20transporation%20mode%20based%20on%20GPS%20data%20forc%20Web%20applications-published.pdf >>, ACM Transactions on the Web, vol. 4, No. 1, Jan. 2010, pp. 1-1:36.

Zheng, et al., "Geolife2.0: A location-based social networking service", Retrieved at << http://research.microsoft.com/pubs/79441/GeoLife2.0%20A%20Location-Based%20Social%20Networking%20Service.pdf >>, Tenth International Conference on Mobile Data Management: Systems, Services and Middleware, MDM, May 18-20, 2009, Pages 2.

Yoon; et al., "Smart Itinerary Recommendation based on User-Generated GPS Trajectories", http://research.microsoft.com/apps/pubs/default.aspx?id=138036, Published Oct. 25, 2010.

PRIORITIZING TRAVEL ITINERARIES

BACKGROUND

Traveling is a very popular leisure activity that people may under take in their free time, while on vacation, or when visiting a new area (e.g., a city or country). Often, travelers can find it challenging to make the most out of their available time when traveling, in light of a potential desire to have a quality travel experience. If limited in time, a traveler may not have the luxury of 'trial-and-error' to find interesting locations and routes, where potential visits may end up wasting available time. Travelers often use online (e.g., the Internet) resource to search for interesting travel locations, and/or routes of travel. For example, online mapping sites can provide travel routes from a start and end point, and points of interest may be displayed.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

There are a few available options that provide a list of potential travel itineraries to a user; however, they cannot typically prioritize the itineraries based on potential interest levels of various locations comprised in the itinerary. Commercial travel agencies can provide a handful of itineraries starting and ending in major locations with fixed duration of travel, which force travelers to adapt to the itineraries, rather than receiving an itinerary based on the user's needs. Travelers may also ask local residents in the region or refer to travel experts through travel web sites for recommendations. However, these techniques are often burdensome and may not provide desired results for the user.

Accordingly, one or more techniques and/or systems are disclosed where an inexperienced traveler may learn from experienced travel experts, for example, and active residents of a region to build an improved travel plan. Historical travel sequences provided by travelers may be utilized to build a location-interest graph, which provides information for building improved itineraries for a user, based on the user's query. For example, where the user provides a start and end point, and a travel duration in a query, one or more prioritized travel itineraries can be built using the query criteria.

In one embodiment for prioritizing one or more travel itineraries based on an itinerary query, respective candidate itineraries from a set of candidate itineraries that have been identified from a location-interest graph using the query, are ranked based on one or more ranking factors for the candidate itineraries. Further, a selected number of the ranked candidate itineraries (e.g., a top-k rank range) are re-ranked based on one or more historical travel sequences, such that one or more prioritized travel itineraries can be identified for the user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
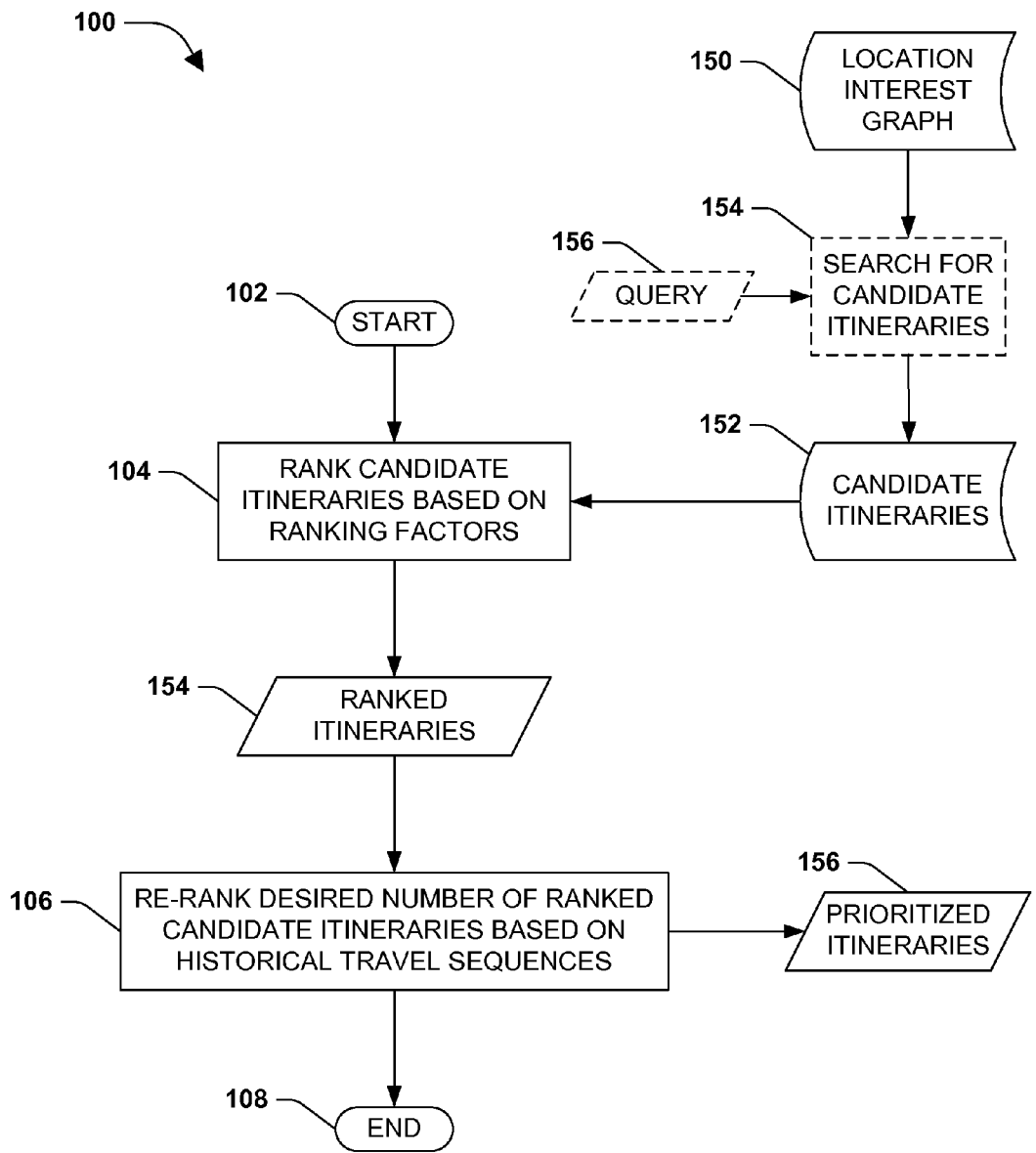
FIG. 1 is a flow diagram of an exemplary method for prioritizing one or more travel itineraries based on an itinerary query.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can provide one or more itineraries, such as to a traveler new to an area, which may make efficient use of a given duration by considering one or more accumulated travel routes and/or experiences, for example. For example, user-generated GPS trajectories may be stored in the "cloud" and accumulated as "good" examples for data mining. In this example, a plurality of features may be extracted, such as where to stay, how long to stay and/or how long to travel, for example, in order to aid a new user in building an efficient travel itinerary.

It will be appreciated that, while GPS trajectories may be stored, they can also be provided by users that agree to submit trajectories, and/or agree to have trajectories collected. It is anticipated that merely those user generated GPS trajectories that are provided by users that provided permission to store will be utilized. Further, the user generated GPS directories can be anonymized, for example, such that user-related personal (e.g., location) information is not collected and/or stored. Moreover, in one embodiment, the collected and/or stored information comprises merely knowledge aggregated from the user-generated trajectories instead of an individual trajectory. For example, the collected information can be comprised in a black-box type of operation such that a connection between a recommended itinerary and a specific user-generated GPS trajectory can not be discerned, for example.

FIG. 1 is a flow diagram of an exemplary method 100 for prioritizing one or more travel itineraries based on an itinerary query. The exemplary method 100 begins at 102 and involves determining a rank for respective candidate itineraries from a set of candidate itineraries 152 that have been identified from a location-interest graph 150 using the itinerary query, at 104. Here, the ranking of the candidate itineraries 152 from the set is based on one or more ranking factors for the candidate itineraries 152. In one embodiment, as an optional act in the exemplary method 100, at 154, a search can be performed for the candidate itineraries based on a query 156 for a desired itinerary (e.g., from a user), as is explained in more detail below.

As an example, multiple user-generated GPS trajectories may be used to model one or more typical routes in an area, where the trajectories can comprise connections between locations and a time relationship between locations (e.g., how long it takes to travel between locations, which may also consider and/or comprise a duration of stay at respective locations). In one embodiment, user-generated GPS trajectories may be uploaded to, and stored in a distributed cloud computing network (cloud), such as from automated GPS trackers, and/or from participating users, experts, and/or hired consultants, for example. From the plurality of trajectories, for example, a location interest graph can be generated, comprising locations as nodes in the graph, and edges as travel sequences between nodes.

In one embodiment, some ranking threshold values can be used to quickly reject potentially undesirable candidates (e.g., reject candidate itineraries with an elapsed time ratio less than 0.5), for example. In this example, different weight values for the ranking factors can be assigned to the respective factors, such as by setting values for a1, a2, and a3 in the equation below, for example. In one embodiment, ranking factors can be treated as equally important, for example, by setting their respective weights as a1=a2=a3=1. In this embodiment, a Euclidean distance (ED) of respective candidate itineraries (e.g., trips) can be determined using these ranking factors as dimensions (e.g., three rankings comprising dimensions in a graph), for example. In the example equation, below, ETR can comprise an elapsed time ratio for a trip, STR can refer to stay time ratio for a trip, and IDR can refer to interest density ratio, as discussed in more detail below.

$$ED=\sqrt{\alpha_1(ETR)^2+\alpha_2(STR)^2+\alpha_3(IDR)^2}$$

In one embodiment, the candidate itineraries that comprise an area described in the query, and a time comprised in the query may be selected. For example, the user can select a start and finish point, and a desired time duration for the trip (e.g., start address or GPS point, finish address or GPS point, duration, and possible mode of travel) as part of the query. Respective possible itineraries can be identified, such that the user can complete the trip in the duration. In one embodiment, the ED can be determined for respective candidate itineraries in the set (e.g., ones that meet the query parameters of start, finish and duration), for example, where the itinerary having a lowest ED can comprise the itinerary with a highest rank.

At 106 in the exemplary method 100, a desired number of the respective ranked candidate itineraries 154 are re-ranked based on a one or more historical travel sequences, resulting in a prioritized list of itineraries 156. For example, the desired number of ranked candidate itineraries 154 may comprise a desired number of higher ranker itineraries (e.g., top ten ranked itineraries), or the respective itineraries ranked in a percentage range (e.g., top ten percent of ranked itineraries), or respective candidate itineraries meeting a desired ranking threshold (e.g., itineraries meeting a selected ED), or some other selection criteria. In one embodiment, a second ranking can be determined for the selected ranked candidate itineraries using the historical travel sequences.

In one embodiment, the historical travel sequence can comprise aspects of the location-interest graph, such as a number of travelers traveling into and out of a location, and/or a number of travelers that have taken a particular sequence. For example, an historical travel sequence can integrate an authority score of going in and out of a location and a hub score, to provide a score for a travel sequences.

Figure 4:
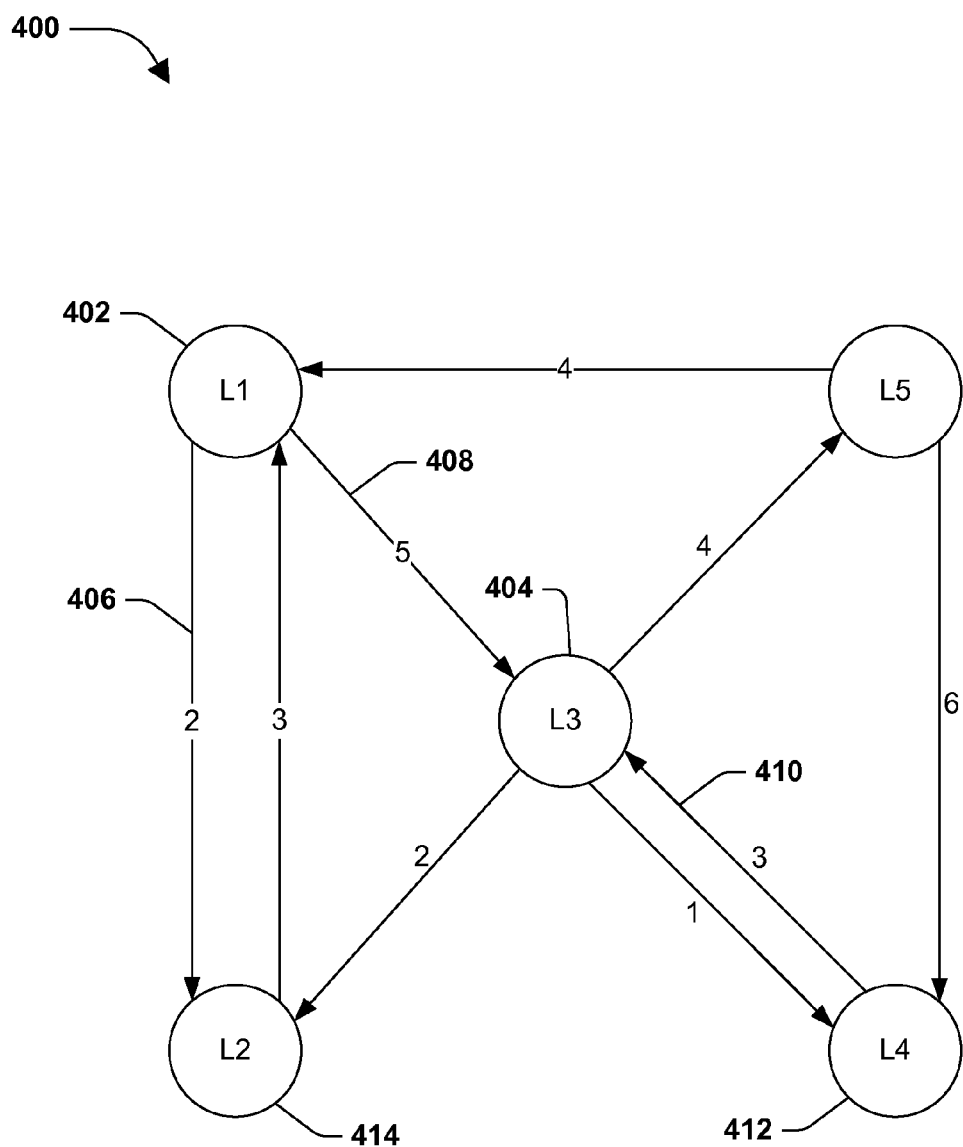
FIG. 4 is an illustration of one or more example travel sequences.

FIG. 4 is an illustration of one or more example travel sequences 400, which may be used as an illustrative example to demonstrate a calculation of a score for a two-length travel sequence from location one 402 (L1) to location three 404 (L3). In this example, a connected edge, such as 406, 408, 410, can represent traveler transition sequences, and a value on the edges show a number of times a traveler has taken the sequence (e.g., a number of travelers between locations).

In one embodiment, as illustrated by FIG. 4, a calculation of a travel sequence score can be based on an authority score of location one 402 (al1), weighted by a probability of people moving out from this location in the sequence (OutL1;L3). In the example 400, OUTL1;L3 is equal to five sevenths (e.g., out of the 7 travelers moving out of location one 402, five moved 408 to location three 404, and two moved 406 out to location two 414). Further, in this embodiment, the calculation of the travel sequence score can be based on an authority score of location three 404 (al3) weighted by a probability of travelers moving in to this location 404 by this sequence (INL1;L3). In the example 400, INL1;L3 is equal to five eighths (e.g., out of eight travelers moving into location three 404, five moved 408 from location one 402, and three moved 410 in from location four 412).

Additionally, in one embodiment, the calculation of the travel sequence score can be based on a hub score (hb) of the travelers (UL1;L3) who have taken this sequence (e.g., total travelers or percentage of travelers going from location one 402 to location three 404). In the example 400, a total of five travelers moved 408 from location one 402 to location three 404. Alternately, of all the travelers that went to location one 402 (e.g., seven) five moved to location three 404; therefore, the hub score may equal five sevenths, for example. In one embodiment, a variety of scores may be combined to determine a travel sequence score for a selected ranked itinerary.

Returning to the exemplary method 100 of FIG. 1, having re-ranked the desired number of ranked candidate itineraries based on the historical travel sequences, the exemplary method 100 ends at 108.

Figure 2:
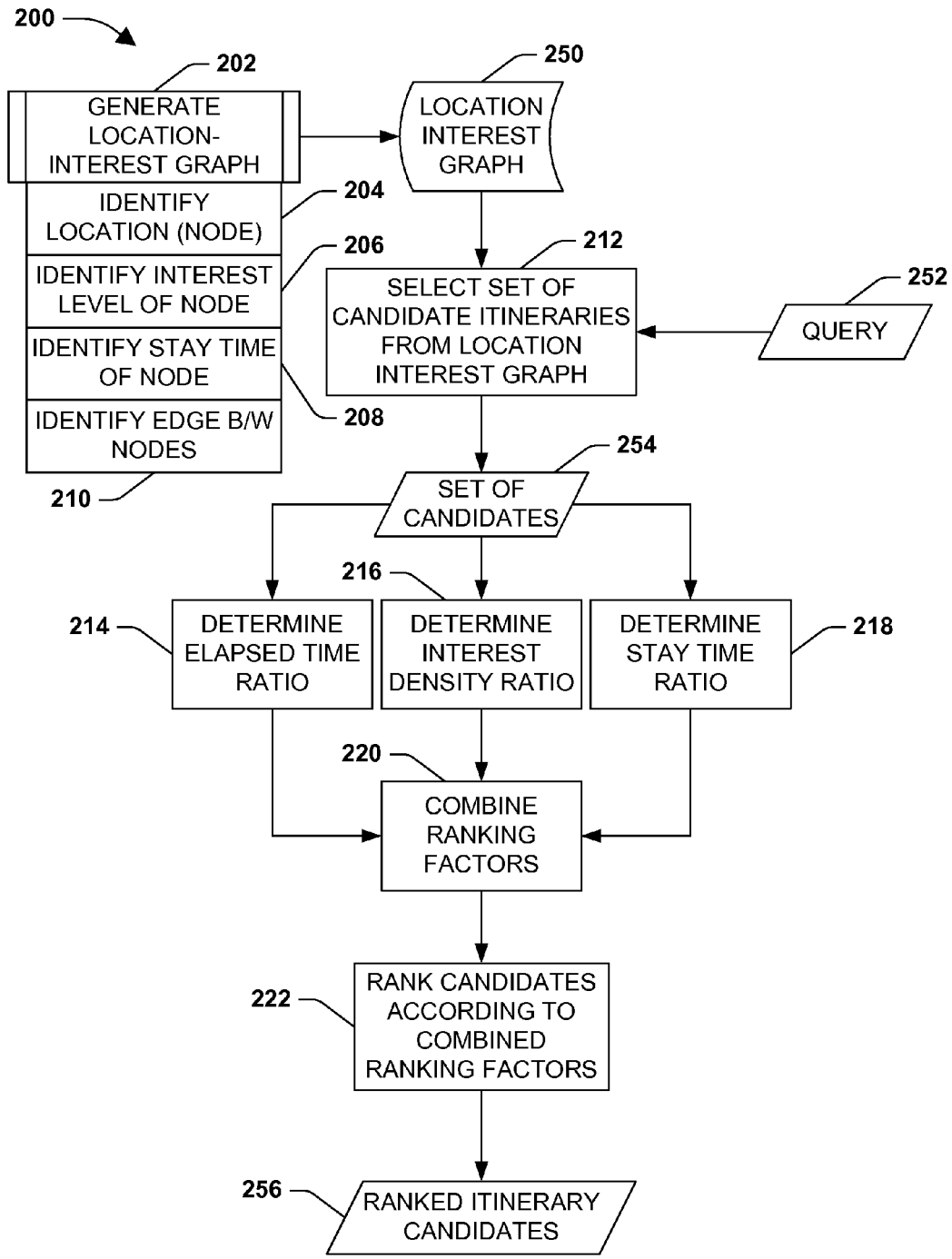
FIG. 2 is a flow diagram of an example embodiment where at least some of one or more techniques described herein are implemented.

FIG. 2 is a flow diagram of an example embodiment 200 where one or more techniques described herein are implemented. At 202, a location-interest graph is generated. At 204, generating the location-interest graph can comprise identifying a node for the graph, which comprises a geographical location. For example, a location can comprise a point of interest (e.g., city, museum, restaurant, house, park, etc.) that has been visited by one or more travelers whose GPS trajectories were saved to the cloud.

In one embodiment, a location can comprise a cluster of "stay points" detected from the user trajectories. In one embodiment, a "stay point" can comprise a geographical region where a user stayed over a period time (e.g., meeting a time threshold, such as five minutes) within a certain distance (e.g., meeting a distance threshold, such as fifty meters). For example, as a user moves through a trip, the trajectory of the trip may be characterized by a sequence of points, where some points comprise "stay points" (e.g., those that meet the desired time and distance thresholds). A user can stop at a restaurant during the trip and spend thirty minutes eating lunch, for example. In this example, the time spent at the restaurant, along with little to no movement while at the restaurant, can indicate a stay point.

In this embodiment, a plurality of trajectories may be identified, and the stay points comprised in the trajectories can be clustered together (e.g., using some clustering algorithm) to indicate locations for the location-interest graph. In one embodiment, a stay point threshold may be used to identify a location, for example. In one embodiment, the locations indicated by the stay points from the trajectories can comprise the nodes in the location-interest graph for a desired area.

At 206 in the exemplary embodiment 200, a level of interest can be identified for respective nodes. In one embodiment, a level of interest may be based on a number of user visits to a location, and may also be based on a level of user experience for user's visiting the location. For example, if more travelers visit a location a higher interest level may be assigned to that location. Further, in this example, a greater level of traveler experience for users that visit the location can attribute a higher level of interest for that location.

In one embodiment, a level of experience of a user can be attributed to a level of interest for the locations visited by the user. In this embodiment, this relationship between experience and interest for a location can be mutually reinforcing. For example, an experienced user will typically visit many interesting places, and interesting places will typically be visited by many experience users. Therefore, when a location's interest level increases due to many visits by users, those user's that do visit the location will have an increase in their experience level, for example. In this way, in this example, users that are relatively local to a location will likely have a higher experience level due to many visits to those locations with higher interest, and local locations can gain a higher interest level by visits from local experienced users.

At 208 in the exemplary embodiment 200, a stay time for respective nodes can be identified. As described above, a stay time can comprise an amount of time a user stays at a location during a trajectory. In one embodiment, identifying the stay time can comprise identifying a median stay time using a plurality of stay times from the historical travel sequences, such as from user trajectories uploaded to the cloud.

For example, as described above, a plurality of historical travel sequences can comprise user trajectories (e.g., GPS trajectories) that have been uploaded and stored in the cloud. In this example, these trajectories may be examined to identify stay times for user stay points that correspond to the node that comprises the location (e.g., a cluster of stay points). Further, in this example, the median stay time from the plurality stay times can be used as the node's stay time in the location-interest graph. In an alternate embodiment, an average stay time from the plurality of stay times from historical travel sequences may be used as the node's stay time, or some other statistical value of stay times that is appropriate for a node stay time.

At 210 in the exemplary embodiment 200, an edge for the location-interest graph can be identified, which can comprise a travel trajectory between two nodes in the graph. That is, for example, a travel trajectory between nodes may comprise a route traveled by the user of the uploaded trajectory between two locations (e.g., represented by the nodes in the graph); or it may comprise a trajectory between the two locations that does not comprise an actual route traveled by a user (e.g., or potential user). In one embodiment, identifying the edge can comprise identifying a median travel trajectory using a plurality of travel trajectories from historical travel sequences.

For example, as described above, the historical travel trajectories can comprise trips or routes traveled by users that have been stored (e.g., by uploading to the cloud network), such as for a particular area, or plurality of areas. In this example, the historical trajectories can be examined, and routes traveled between the two locations in the plurality of trajectories can be identified. Further, a median route (e.g., or average, or some other appropriate statistical representation) may be determined from the identified routes, and used as the edge between the nodes in the location-interest graph.

In one embodiment, identifying the edge can further comprise identifying a median travel time between the two nodes in the graph using the plurality of travel trajectories from the historical travel sequences. For example, the historical travel trajectories can comprise trips or routes traveled by users that have been stored, respectively comprising travel times for the route between the locations. In this example, the historical trajectories can be examined, and route travel times between the two locations in the plurality of trajectories can be identified. Further, a median route travel time (e.g., or average, or some other appropriate statistical representation) may be determined from the identified times, and used as a value corresponding to the edge between the nodes in the location-interest graph.

At 212 in the exemplary embodiment 200, the location-interest graph 250 can be used to select the set of candidate itineraries 254. In one embodiment, the set of candidate itineraries 254 can be identified from the location-interest graph 250 using the query 252, for example, from a new route user who may be looking for an interesting itinerary. In one embodiment, the query 252 can comprise a starting location, an ending location, and a desired duration for the itinerary.

For example, the new user may have arrived in a city that is unknown to them, and they may wish to spend a few hours walking around their hotel to explore. In this example, the user can enter the query comprising their hotel as a starting and ending location, and three hours as the duration. Further, in one embodiment, the query may comprise the user's travel mode, for example, walking (e.g., so that the duration for the itinerary corresponds appropriately to accommodate a walking pace).

In one embodiment, identifying the set of candidate itineraries 252 using the query 252 can comprise comparing the starting location and the ending location, comprised in the query, with one or more locations in the location-interest graph. For example, routes identified in the location-interest graph that do not start and end at the new user's hotel may not be considered as potential candidates. Further, in this embodiment, identifying the set of candidate itineraries 254 using the query 252 can comprise comparing the duration, comprised in the query, with a combination of a travel time between locations in the location-interest graph and a stay time for the locations in the location interest graph.

For example, a selected candidate itinerary can comprise a duration that accounts for both the travel time between respective locations and the time the new user may spend at respective locations. In one embodiment, the duration from the query can be compared with one or more time-related factors in the location-interest graph. As an example, the duration of any selected candidate itinerary from the location-interest graph, for the new user, can comprise a sum of the time it takes for the new user to walk the route in the itinerary (e.g., sum of travel times for edges in graph), and the time the new user spends at each location in the itinerary (e.g., sum of stay times for nodes in the graph).

In one embodiment, in order to identify a set of candidate itineraries 254, a set of trip candidates can be identified from the location-interest graph. In this embodiment, respective trip candidates can comprise trips that have a starting point and ending point that matches those of the query 252, and a duration that at least meets the query duration (e.g., does not exceed the time of the duration). For example, in this embodiment, the potential trips that start from the query starting point, end and the query ending point, and do not exceed the time from the query's duration can be identified as trip candidates.

Further, in this embodiment, a trip candidate value for the respective trip candidates in the set of trip candidates can be compared with a desired threshold value to identify a threshold difference (e.g., difference between the trip candidate value and the threshold value). In one embodiment, in order to determine the "value" for the trip candidate and threshold, a combination of trip factors may be used. For example, trip factors may comprise one or more of: an elapsed time ratio (ETR), a stay time ratio (STR), and an interest density ratio (IDR).

In one embodiment, the ETR can comprise a comparison of the query duration and the trip candidate duration. For example, if the query duration is three hours and the trip candidate duration is two hours, the ETR for this comparison may be two to three (e.g., ratio of 2:3, or $\frac{2}{3}^{rds}$, or 0.67). In one embodiment, the STR can comprise a comparison of the stay time for the trip candidate and the travel time between locations for the trip candidate. For example, if the trip candidate comprises a stay time (e.g., comprising a sum of all the stay times in the trip) of one hour, and a travel time (e.g., comprising a sum of all the travel times between locations in the trip) of two hours, the STR may be one to three (e.g., a ratio of 1:3, or $\frac{1}{3}^{rd}$, or 0.33).

In one embodiment, the IDR can comprise a comparison of an interest level value for respective locations in the trip candidate with the number of locations in the trip candidate. For example, an interest level for respective locations in the trip candidate can be summed (e.g., a summation of the interest levels for all of the locations in the trip candidate) and that sum can be divided by a number of locations in the trip candidate. As an illustrative example, trip candidate may comprise five locations, respectively having interest levels of: 0.2, 0.5, 0.3, 0.8, and 0.7. Therefore, in this example, the IDR for the trip candidate can be 0.5 (e.g., divide the total interest level of 2.5 by five locations).

As an illustrative example, those trip candidates comprising higher trip factor ratios may be considered more desirable to a new user. For example, the user may wish to pack as much as possible into their itinerary, therefore a higher ETR, STR, and IDR would be more desirable. Alternately, if the new user wished to have more travel time than stay time, for example, a lower STR may be more desirable. In one embodiment, a desired threshold value for a candidate trip may comprise a combination of ideal ratios, for example, as expressed by the user submitting the query. For example, if the new user submitting the query desired to visit as many locations as possible, in the allotted time, while having the most interest, an ideal ratio value for the respective trip factors may be one (e.g., having an ETR=1, a STR=1, and a IDR=1).

In one embodiment, respective trip factor values for the trip candidates can be identified and plotted in three-dimensional space, for example, comprising the ETR, STR and IDR as the respective axes of the 3D space. In this embodiment, a distance from the desired threshold value plotted on the three-dimensional space (e.g., having an ETR, STR and IDR value of one) to the respective plot locations for the trip candidates can be measured. Further, the respective trip candidates can be ranked according to the measured distances.

In one embodiment, the set of candidate itineraries 254 can be selected from the one or more trip candidates corresponding to a desired range of identified threshold differences, where the set of candidate itineraries comprises a subset of the set of trip candidates. For example, a top twenty ranked trip candidates may be selected from the set of trip candidates to be used for the set of candidate itineraries. As another example, merely the first ten ranked trip candidates in the set may be selected, such as where one or more ranked trip candidates have a same ranking. In another embodiment, merely those trip candidates that meet a desired distance threshold may be selected for the set of candidate itineraries, for example, where the distance between the desired threshold value and trip candidate value in the 3D space meet the distance threshold (e.g., are less than or equal to a desired distance).

In the exemplary embodiment 200 of FIG. 2, having selected the set of candidate itineraries 254, an ETR, IDR and STR is determined for the candidate itineraries, at 214, 216 and 218 respectively. As described above, the ratios may be identified as ranking factors for the respective candidate itineraries, and combined, at 220. In one embodiment, the ranking factors can comprise factors relating to a duration of the candidate itinerary, a travel time between the locations in the candidate itinerary, a stay time for location in the candidate itinerary, and a location interest factor for the candidate itinerary.

When determining the ranking factors used to rank the candidate itineraries, the duration of the candidate itinerary can be used to determine a candidate itinerary ETR by comparing the query duration with the duration of the candidate itinerary. Further, the travel time between locations for the candidate itinerary and/or the stay time at a location for the candidate itinerary can be used to determine a candidate itinerary STR by comparing the stay time at a location in the candidate query with the travel time between locations in the candidate itinerary. Additionally, the location interest factor for the candidate itinerary can be used to determine candidate query IDR by comparing an interest level value for respective locations in the candidate itinerary with a number of locations in the candidate itinerary.

In one embodiment, at 220, the values from the ratios for the candidate itinerary can be combined, for example, by adding the values, plotting the values on a three-dimensional graph, or some other function that provides for an appropriate delineation between combined values for the candidate itineraries. At 222, the candidate itineraries are ranked according to their respective combined ranking factor values. For example, a candidate itinerary having a more desired combination of ranking factor values (e.g., higher) may be ranked higher than one having a less desirable (e.g., lower) combination of ranking factor values. Accordingly, in this exemplary embodiment 200, a set of ranked itinerary candidates 256 may be provided.

Figure 3:
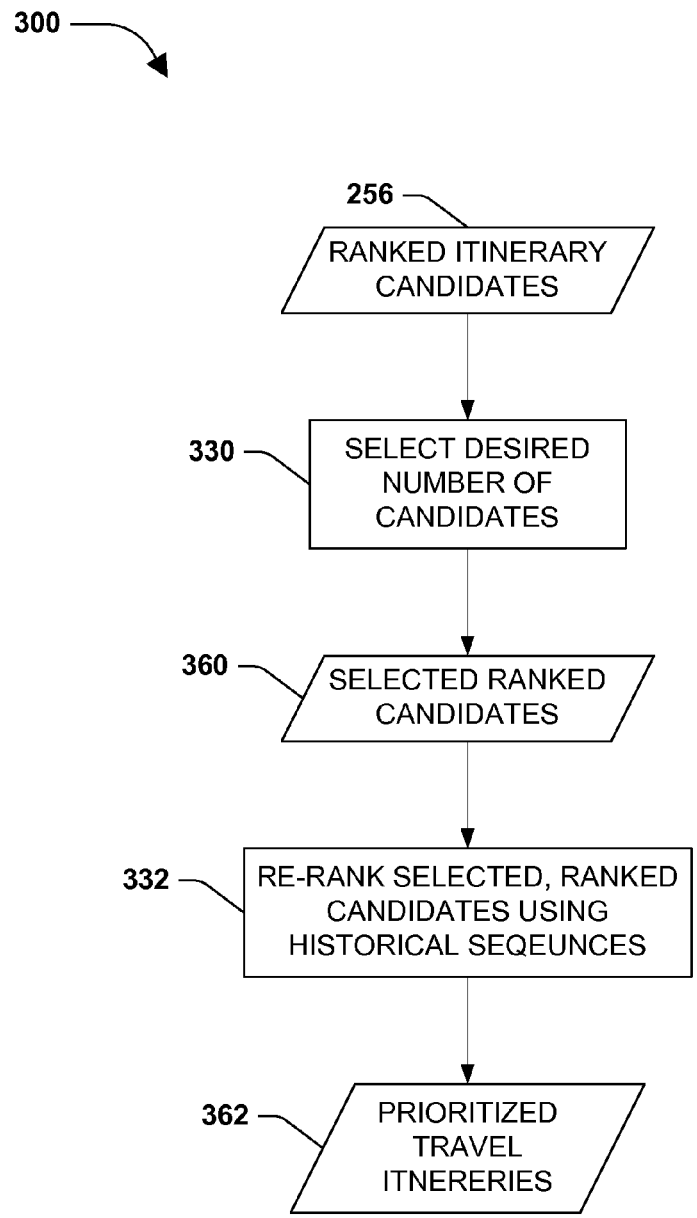
FIG. 3 is a flow diagram illustrating an exemplary embodiment of at least some of an implementation of one or more techniques described herein.

FIG. 3 is a flow diagram illustrating an exemplary embodiment 300 of an implementation of one or more techniques described herein. At 330, a desired number of itinerary candidates are selected from the set of ranked itinerary candidates 256. In one embodiment, merely those ranked candidate itineraries that meet a desired rank threshold may be selected. For example, merely the top ten candidate itineraries may be selected for re-ranking, or a top twentieth percentile of ranked candidates.

At 332, the selected ranked candidates 360 are re-ranked using the historical travel sequences, to produce a set of prioritized travel itineraries 362, such as in response to a user query (e.g., 252 of FIG. 2). For example, as described above with regard to FIG. 4, historical travel sequences can provide a "most travelled route" type ranking for candidate itineraries, where those candidate itineraries that have historically been more travelled may have a higher ranking than those that have not been traveled as much. As an illustrative example, a route described by a first candidate itinerary may have been traveled by ten travelers according to stored travel trajectories (e.g., uploaded from travelers, and/or detected using tracking systems, such as GPS), and a second candidate itinerary may have been traveled by fifteen travelers. In this example, the second candidate itinerary can be re-ranked higher than the first due to it being a historically more popular route of travel.

In one embodiment, when re-ranking the respective ranked candidate itineraries based on historical travel sequences, a number of historical travel sequences of travelers to a first location from one or more second locations can be combined with an experience level of the travelers. As described with regard to FIG. 4 above, when travelling from location one 402 to location three 404, a number of travelers moving from and to location (e.g., 406, 408, 410) can be used to identify a travel sequence score for the travel sequence L1→L3.

In this embodiment, the travel sequence score can also comprise the experience level of respective travelers to and from the locations used to calculate the score. For example, when calculating a segment score, respective travelers can be weighted by their experience level, such as assigning a weight of one to a highest level of experience, and using the experience level for the travel sequence. For example, as illustrated in FIG. 4, the five users moving 408 from location one 402 to location three 404 may comprise experience levels of: 0.1, 0.5, 0.5, 0.6, and 0.7. In this example, the combined user travel sequence score can comprise 2.4 (e.g., instead of five) for the travel sequence 408 from location one 402 to location three 404. In this way, in this example, those historical travelers having a higher experience level can weight a travel sequence higher, while those historical travelers having a lower experience can weight a travel sequence lower, thereby providing an adjusted ranking for a candidate itinerary.

In one embodiment, the prioritized travel itineraries 362, comprising re-ranked itinerary candidates, can be presented in response to the itinerary query. For example, a user may submit a query, such as using a search engine, for an itinerary from a desired start point to a desired end point, involving a desired amount of time. In response, the prioritized list of itineraries (e.g., or merely the highest ranked itinerary) can be returned to the user, such as in the search engine results display.

A system may be devised that can provide one or more itineraries, such as to a traveler new to an area, which may make efficient use of a given duration by considering multiple users' accumulated travel routes and experiences, for example. User-generated GPS trajectories can be stored in the "cloud" (e.g., remote-based computing management, utility and/or storage network) and accumulated as desired examples for data mining. In this example, a plurality of features may be extracted, such as where to stay and/or how long to travel, in order to aid a new user in building an efficient travel itinerary.

Figure 5:
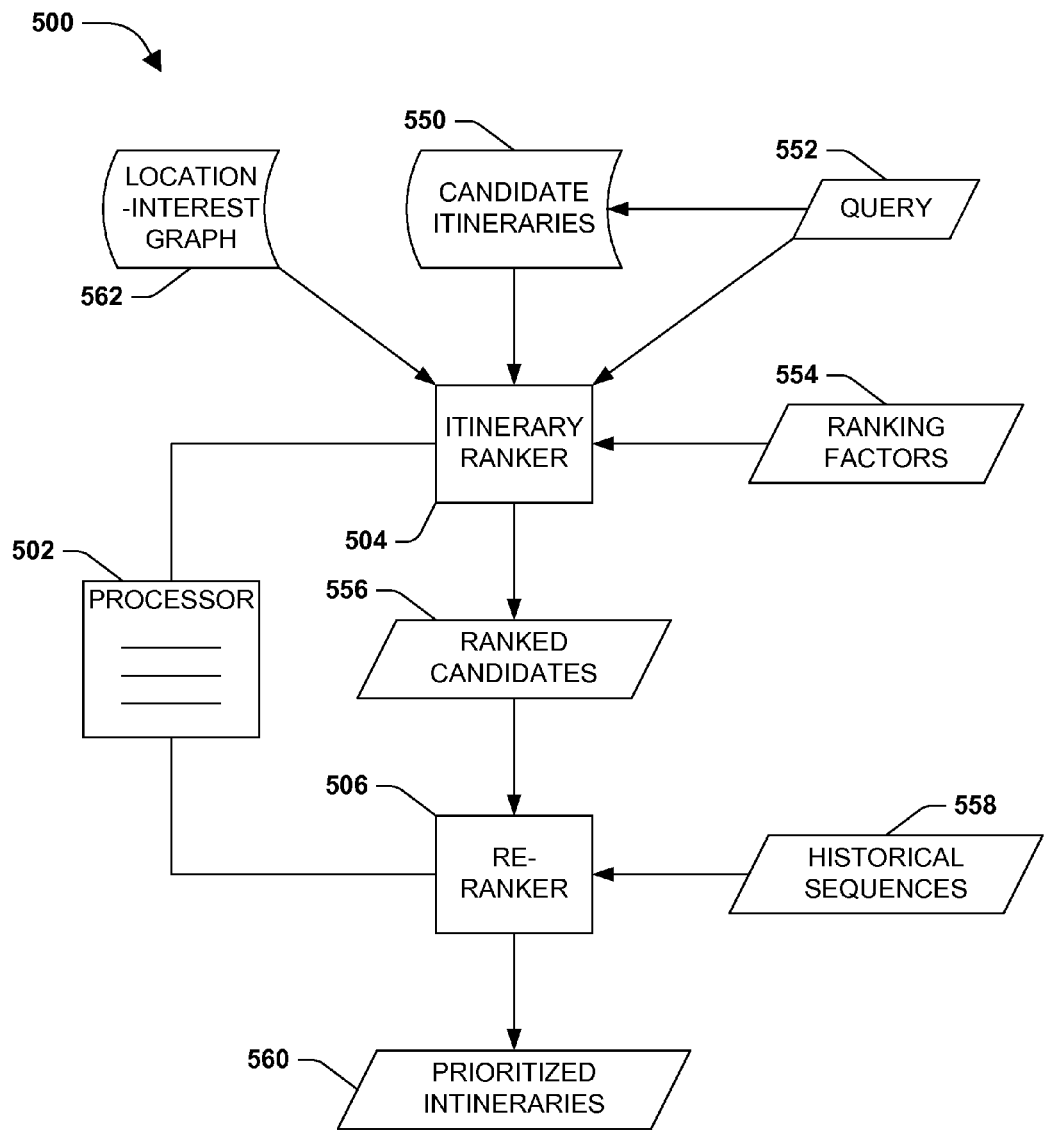
FIG. 5 is a component diagram of an exemplary system for prioritizing one or more travel itineraries based on an itinerary query.

FIG. 5 is a component diagram of an exemplary system 500 for prioritizing one or more travel itineraries based on an itinerary query. A computer-based processor 502 is used to process data for the system 500, and the processor 502 is operably coupled with an itinerary ranking component 504 that ranks itineraries 556 using one or more ranking factors 554 for the respective itineraries, where the itineraries comprise candidate itineraries from a set of candidate itineraries 550 identified from a location-interest graph 562 using the query 552.

Operably coupled with the itinerary ranking component 504 is a re-ranking component 506, which re-ranks ranked candidate itineraries 556 within a desired rank range using one or more historical travel sequences 558, to yield prioritized travel itineraries 560. In one embodiment, the ranking factors 554 can comprise a stay time ratio that comprises a comparison of a stay time at a location and a travel time between locations, such as identified in the location-interest graph 562. Further, the ranking factors 554 can comprise an interest density ratio that comprises a comparison of an interest level value for respective locations in the candidate itinerary and a number of locations in the candidate itinerary, such as identified in the location-interest graph 562. Additionally, the ranking factors 554 can comprise an elapsed time ratio that comprises a comparison of a query duration with the duration of the candidate itinerary, such as identified in the location-interest graph 562 and the query 552.

In one embodiment, the location-interest graph 562 can comprise a plurality of nodes that respectively correspond to a location, such as a geographical region comprising one or more clustered stay points from user-generated trajectories stored in the cloud, for example. Further, the location-interest graph 562 can comprise an interest level for respective nodes, which corresponds to a potential level of interest that a traveler may have for the location (e.g., which may correspond to a number of previous visits by historical travelers).

In one embodiment, the location-interest graph 562 can comprise a stay time for respective nodes, which comprises a median amount of time a person stays at the location. For example, the median stay time can be identified from a plurality of stay times from the historical travel sequences. Further, the location-interest graph 562 can comprise one or more edges between nodes (e.g., locations), where the edges comprise a travel trajectory (e.g., route of travel) between two nodes. Additionally, in one embodiment, the edge between two nodes in the graph 562 may comprise a travel time, such as a median travel time between locations as identified from historical travel sequences, for example.

Figure 6:
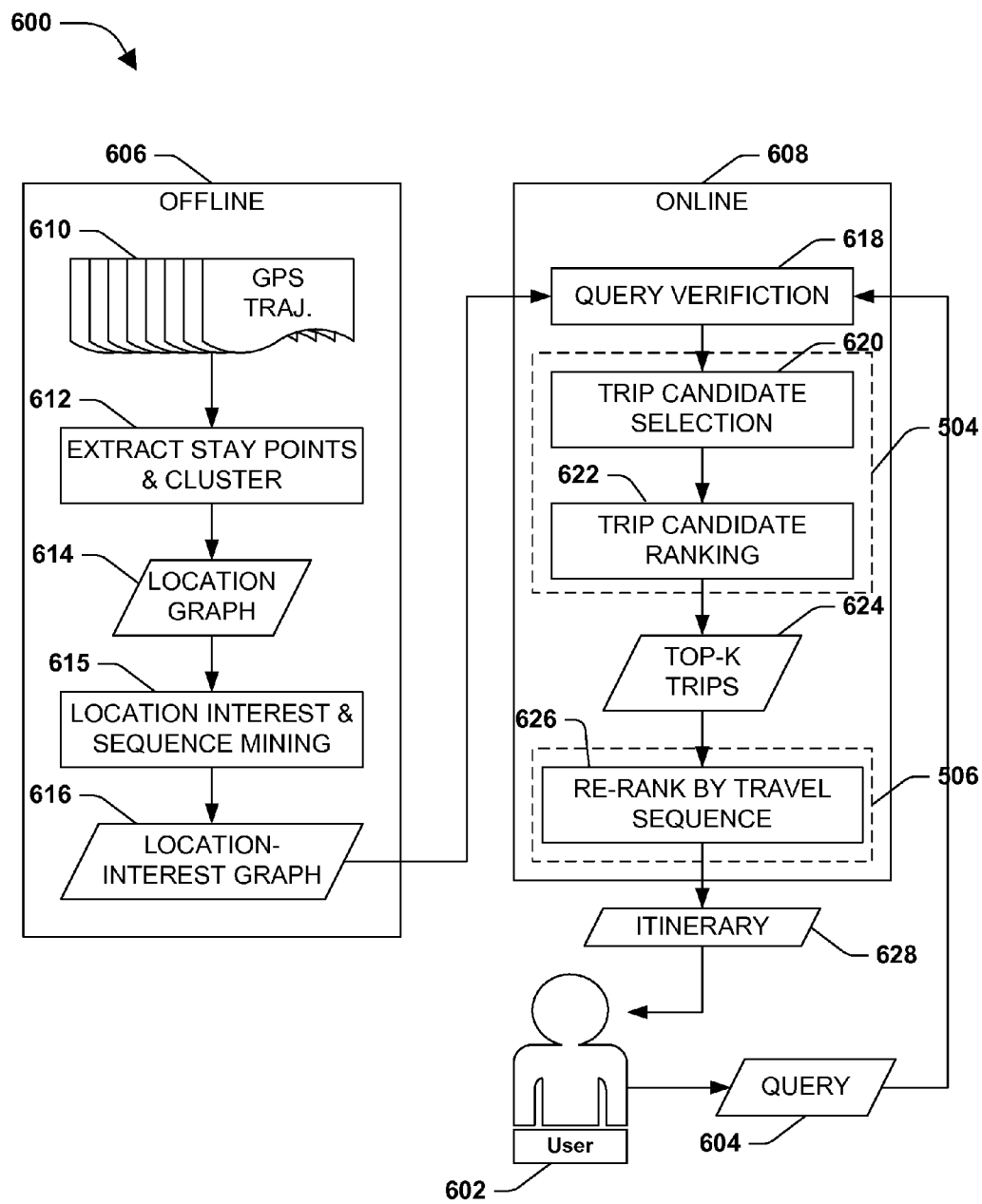
FIG. 6 is an illustration of an example implementation of at least some of one or more techniques and/or systems described herein.

FIG. 6 is an illustration of an example implementation 600 of one or more techniques and/or systems described herein. In this example implementation 600, a portion of the work can be performed offline 606 (e.g., while the user is not connected online to a search engine for itineraries), and another portion can be performed online 608 (e.g., while the user is connected to an itinerary search engine). Historical trajectories can be uploaded to a remote storage component 610, such as from users that choose to upload trajectories, and/or by some form of travel tracker (e.g., GPS component).

Stay points (e.g., locations visited by the users) can be extracted from the historical trajectories, at 612, and clustered into locations for a location graph 614. Further, using the stored historical travel sequences, location interest and travel sequences can be identified, at 615, to generate a location-interest graph. For example, a continuous location interest graph may be generated for all geographical areas serviced by historical travel sequences. Further, the location-interest graph may be continuously (or periodically) updated as new and additional user travel sequences are uploaded to the remote storage 610.

A user 602 can connect to the travel itinerary search system and submit a query 604 comprising a desired start and end point, and a desired time duration. The query can be verified, at 618, by comparing the terms of the query against an available location-interest graph 616. For example, the query 604 may be verified to determine if the terms (start, end and duration) are possible given the available geographic regions covered by the location-interest graph 616.

In this embodiment 600, the itinerary ranking component 504 can be used to select trip candidates (e.g., selected a set of candidate itineraries from trip candidates), at 620, and rank selected trip candidates (e.g., ranked candidate itineraries), at 622. The re-ranking component 506 can select a desired number of ranked trip candidates, such as the top-k candidates 624, and re-rank them according to historical travel sequences, at 626. A prioritized itinerary 628 can be presented to the user 602, such as by displaying the one or more prioritized itineraries in the itinerary search results.

Figure 7:
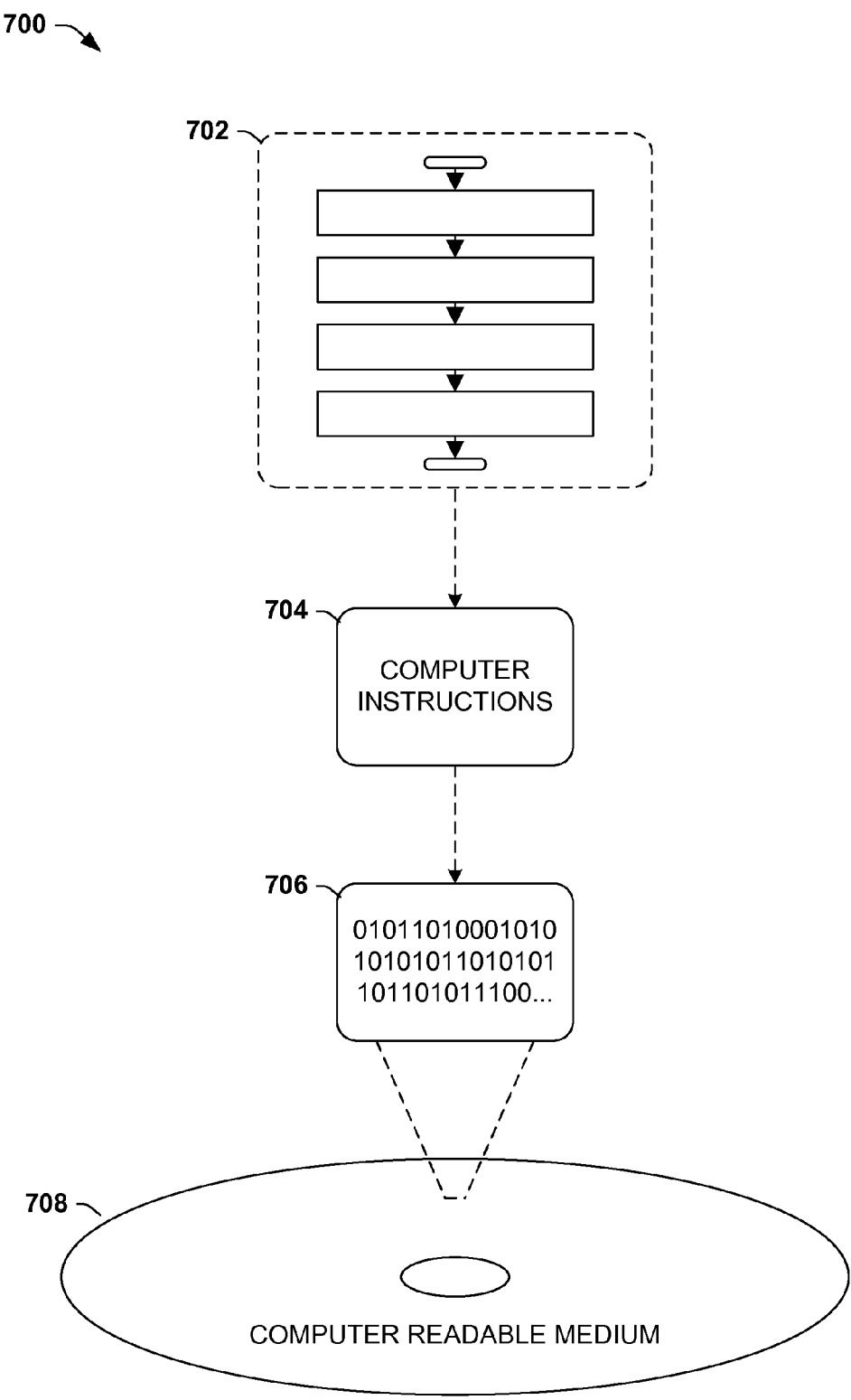
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
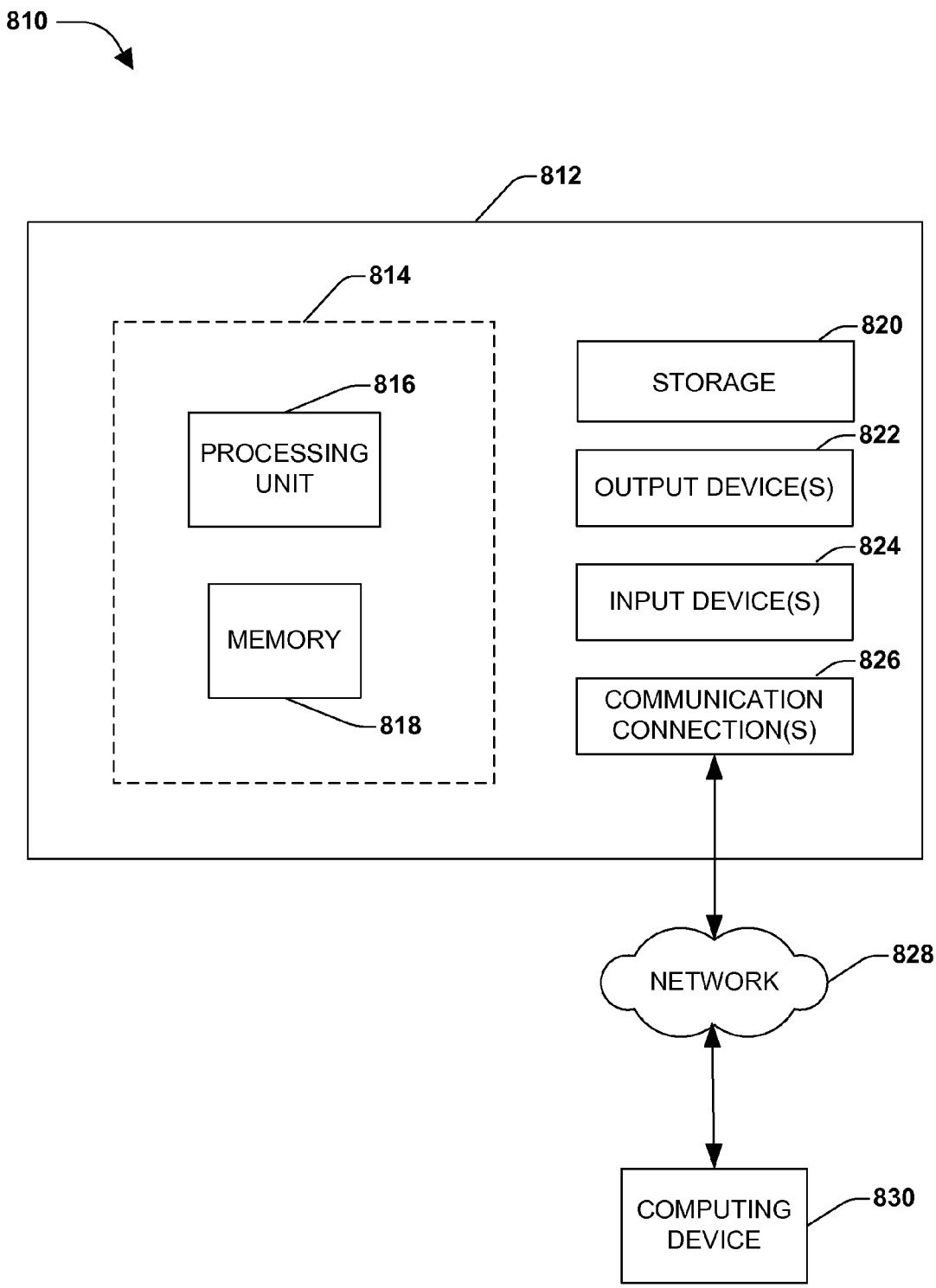
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method, comprising:
receiving an itinerary query comprising a starting location, an ending location and a duration;
identifying a set of trip candidates, from a location-interest graph, comprising:
performing a first comparison of the starting location of the itinerary query with at least one of a first starting location of a first trip candidate, a second starting location of a second trip candidate, a third starting location of a third trip candidate or a fourth starting location of a fourth trip candidate;
performing a second comparison of the ending location of the itinerary query with at least one of a first ending location of the first trip candidate, a second ending location of the second trip candidate, a third ending location of the third trip candidate or a fourth ending location of the fourth trip candidate;
performing a third comparison of the duration of the itinerary query with at least one of:
a combination of at least a first travel time associated with the first trip candidate and a first stay time associated with one or more locations associated with the first trip candidate;
a combination of at least a second travel time associated with the second trip candidate and a second stay time associated with one or more locations associated with the second trip candidate;
a combination of at least a third travel time associated with the third trip candidate and a third stay time associated with one or more locations associated with the third trip candidate; or
a combination of at least a fourth travel time associated with the fourth trip candidate and a fourth stay time associated with one or more locations associated with the fourth trip candidate; and
including the first trip candidate, the second trip candidate and the third trip candidate, but not the fourth trip candidate, within the set of trip candidates based on the first comparison, the second comparison and the third comparison;

identifying:
a first threshold difference for the first trip candidate, the first threshold difference comprising a first difference between a desired threshold value and a first value for the first trip candidate;
a second threshold difference for the second trip candidate, the second threshold difference comprising a second difference between the desired threshold value and a second value for the second trip candidate; and
a third threshold difference for the third trip candidate, the third threshold difference comprising a third difference between the desired threshold value and a third value for the third trip candidate, at least one of the desired threshold value, the first value, the second value or the third threshold value based on one or more trip factors;
selecting the first trip candidate and the second trip candidate, but not the third trip candidate, from the set of trip candidates based on the first threshold difference and the second threshold difference corresponding to a desired range of identified threshold differences, and the third threshold difference not corresponding to the desired range of identified threshold differences;
ranking the first trip candidate and the second trip candidate based on one or more ranking factors;
re-ranking the first trip candidate and the second trip candidate based on one or more historical travel sequences; and
providing the re-ranked trip candidates in response to receiving the itinerary query.

2. The method of claim 1, ranking comprising ranking the first trip candidate, the second trip candidate and one or more other trip candidates based on the one or more ranking factors.

3. The method of claim 1, re-ranking comprising re-ranking the first trip candidate, the second trip candidate and one or more other trip candidates based on the one or more ranking factors.

4. The method of claim 1, the one or more trip factors comprising at least one of an elapsed time ratio, a stay time ratio or an interest density ratio.

5. The method of claim 1, the one or more ranking factors comprising one or more of:
a duration of a trip candidate;
a travel time between locations for the trip candidate;
a stay time at a location for the trip candidate; or
a location interest factor for the trip candidate.

6. The method of claim 1, ranking comprising ranking a trip candidate based on a duration of the trip candidate.

7. The method of claim 1, ranking comprising ranking a trip candidate based on a travel time between locations for the trip candidate.

8. The method of claim 1, ranking comprising ranking a trip candidate based on a location interest factor for the trip candidate.

9. The method of claim 1, re-ranking comprising re-ranking based on an experience level of travelers associated with at least some of the one or more historical travel sequences.

10. The method of claim 1, re-ranking comprising re-ranking merely one or more ranked trip candidates that meet a desired rank threshold.

11. The method of claim 1, ranking comprising ranking the first trip candidate and the second trip candidate based on a first combination of ranking factors for the first trip candidate and a second combination of ranking factors for the second trip candidate.

12. The method of claim 1, comprising generating the location-interest graph comprising:
identifying a node for the location-interest graph comprising a geographical location;
identifying an interest level for the node;
identify a stay time for the node; and
identifying an edge for the location-interest graph comprising a travel trajectory between the node and a second node in the location-interest graph.

13. The method of claim 12, identifying the stay time comprising identifying a median stay time using a plurality of stay times from the one or more historical travel sequences.

14. The method of claim 12, identifying the edge comprising identifying a median travel trajectory using a plurality of travel trajectories from the one or more historical travel sequences.

15. The method of claim 1, at least one of the first trip candidate, the second trip candidate, the third trip candidate or the fourth trip candidate associated with one or more GPS trajectories.

16. The method claim 1, ranking comprising ranking a trip candidate based on a stay time at a location for the trip candidate.

17. A system, comprising:
one or more processing units; and
memory comprising instructions that when executed by at least some of the one or more processing units perform a method, comprising:
receiving an itinerary query comprising a starting location, an ending location and a duration;
identifying a set of trip candidates, from a location-interest graph, comprising:
performing a first comparison of the starting location of the itinerary query with at least one of a first starting location of a first trip candidate, a second starting location of a second trip candidate, a third starting location of a third trip candidate or a fourth starting location of a fourth trip candidate;
performing a second comparison of the ending location of the itinerary query with at least one of a first ending location of the first trip candidate, a second ending location of the second trip candidate, a third ending location of the third trip candidate or a fourth ending location of the fourth trip candidate;
performing a third comparison of the duration of the itinerary query with at least one of:
a combination of at least a first travel time associated with the first trip candidate and a first stay time associated with one or more locations associated with the first trip candidate;
a combination of at least a second travel time associated with the second trip candidate and a second stay time associated with one or more locations associated with the second trip candidate;
a combination of at least a third travel time associated with the third trip candidate and a third stay time associated with one or more locations associated with the third trip candidate; or
a combination of at least a fourth travel time associated with the fourth trip candidate and a fourth stay time associated with one or more locations associated with the fourth trip candidate; and
including the first trip candidate, the second trip candidate and the third trip candidate, but not the fourth trip candidate, within the set of trip candidates based on the first comparison, the second comparison and the third comparison;

identifying:
- a first threshold difference for the first trip candidate, the first threshold difference comprising a first difference between a desired threshold value and a first value for the first trip candidate;
- a second threshold difference for the second trip candidate, the second threshold difference comprising a second difference between the desired threshold value and a second value for the second trip candidate; and
- a third threshold difference for the third trip candidate, the third threshold difference comprising a third difference between the desired threshold value and a third value for the third trip candidate, at least one of the desired threshold value, the first value, the second value or the third threshold value based on one or more trip factors;

selecting the first trip candidate and the second trip candidate, but not the third trip candidate, from the set of trip candidates based on the first threshold difference and the second threshold difference corresponding to a desired range of identified threshold differences, and the third threshold difference not corresponding to the desired range of identified threshold differences;

ranking the first trip candidate and the second trip candidate based on one or more ranking factors;

re-ranking the first trip candidate and the second trip candidate based on one or more historical travel sequences; and providing the re-ranked trip candidates in response to receiving the itinerary query.

18. The system of claim 17, the one or more trip factors comprising at least one of:
- a stay time ratio;
- an interest density ratio; or
- an elapsed time ratio.

19. The system of claim 17, the location-interest graph comprising:
- a plurality of nodes respectively corresponding to a location;
- an interest level for respective nodes;
- a stay time for respective nodes; and
- one or more edges respectively comprising a travel trajectory between two nodes.

20. A computer-readable medium excluding signals comprising instructions that when executed perform a method, comprising:

receiving an itinerary query comprising a starting location, an ending location and a duration;

identifying a set of trip candidates, from a location-interest graph, comprising:
- performing a first comparison of the starting location of the itinerary query with at least one of a first starting location of a first trip candidate, a second starting location of a second trip candidate, a third starting location of a third trip candidate or a fourth starting location of a fourth trip candidate;
- performing a second comparison of the ending location of the itinerary query with at least one of a first ending location of the first trip candidate, a second ending location of the second trip candidate, a third ending location of the third trip candidate or a fourth ending location of the fourth trip candidate;
- performing a third comparison of the duration of the itinerary query with at least one of:
  - a combination of at least a first travel time associated with the first trip candidate and a first stay time associated with one or more locations associated with the first trip candidate;
  - a combination of at least a second travel time associated with the second trip candidate and a second stay time associated with one or more locations associated with the second trip candidate;
  - a combination of at least a third travel time associated with the third trip candidate and a third stay time associated with one or more locations associated with the third trip candidate; or
  - a combination of at least a fourth travel time associated with the fourth trip candidate and a fourth stay time associated with one or more locations associated with the fourth trip candidate; and
- including the first trip candidate, the second trip candidate and the third trip candidate, but not the fourth trip candidate, within the set of trip candidates based on the first comparison, the second comparison and the third comparison;

identifying:
- a first threshold difference for the first trip candidate, the first threshold difference comprising a first difference between a desired threshold value and a first value for the first trip candidate;
- a second threshold difference for the second trip candidate, the second threshold difference comprising a second difference between the desired threshold value and a second value for the second trip candidate; and
- a third threshold difference for the third trip candidate, the third threshold difference comprising a third difference between the desired threshold value and a third value for the third trip candidate, at least one of the desired threshold value, the first value, the second value or the third threshold value based on one or more trip factors;

selecting the first trip candidate and the second trip candidate, but not the third trip candidate, from the set of trip candidates based on the first threshold difference and the second threshold difference corresponding to a desired range of identified threshold differences, and the third threshold difference not corresponding to the desired range of identified threshold differences;

ranking the first trip candidate and the second trip candidate based on one or more ranking factors;

re-ranking the first trip candidate and the second trip candidate based on one or more historical travel sequences; and providing the re-ranked trip candidates in response to receiving the itinerary query.

* * * * *